Figure 1:
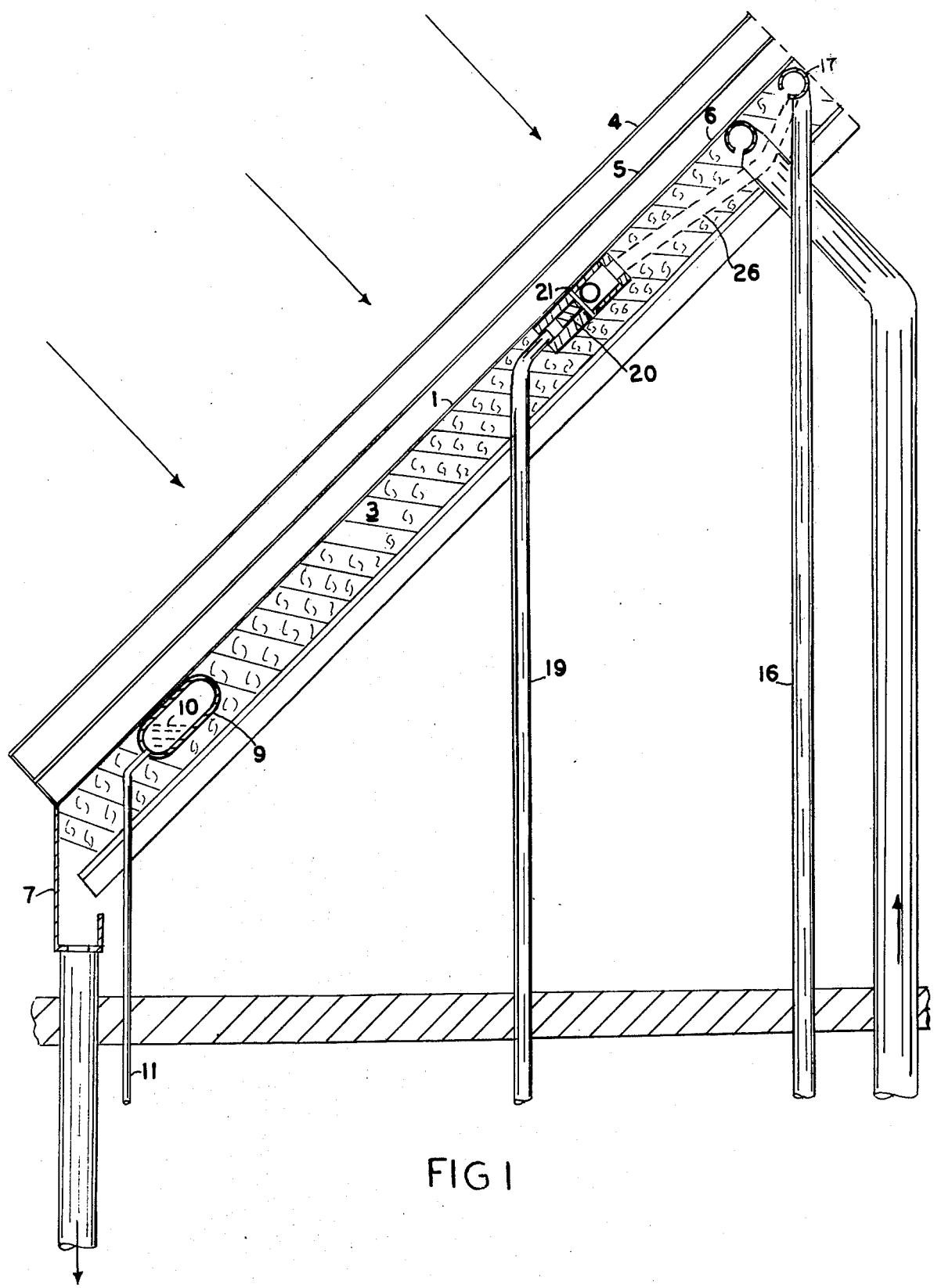

United States Patent [19]

Harrison et al.

[11] 4,153,040
[45] May 8, 1979

[54] PROTECTIVE COOLING SYSTEM FOR SOLAR HEAT COLLECTOR

[75] Inventors: Henry Harrison; Henry C. Harrison, both of Locust Valley, N.Y.

[73] Assignee: Halm Instrument Co., Inc., Glen Head, N.Y.

[21] Appl. No.: 725,032

[22] Filed: Sep. 20, 1976

[51] Int. Cl.² .................................................. F24J 3/02
[52] U.S. Cl. ..................................... 126/271; 237/1 A
[58] Field of Search ............... 126/270, 271; 237/1 A; 137/468, 42, 72, 74

[56] References Cited

U.S. PATENT DOCUMENTS

| 1,891,183 | 12/1932 | Rowley | 137/72 X |
| 1,960,271 | 5/1934 | Lovekin | 137/74 X |
| 1,971,242 | 8/1934 | Wheeler | 126/271 |
| 3,080,880 | 3/1963 | McKie | 137/468 X |
| 3,980,071 | 9/1976 | Barber, Jr,. | 126/271 |
| 3,989,032 | 11/1976 | Harrison | 126/271 |
| 4,043,317 | 8/1977 | Scharfman | 126/270 |

Primary Examiner—Carroll B. Dority, Jr.
Assistant Examiner—Larry Jones
Attorney, Agent, or Firm—James P. Malone

[57] ABSTRACT

An auxiliary system for cooling a solar collector of the type having circulating fluid when normal circulation fails, comprising direct mechanical temperature responsive means for admitting domestic water to the collector automatically when a predetermined safe temperature is exceeded.

7 Claims, 2 Drawing Figures

PROTECTIVE COOLING SYSTEM FOR SOLAR HEAT COLLECTOR

Efficient solar heat collectors can reach a very high temperature if heat transfer water fails to circulate. The possibility of this high temperature rules out many materials of construction such as plastics which would otherwise be advantageous for sealing, for transparent covers, for insulation, for pipe connections, or for absorbing surfaces. It is therefore very desirable to limit the temperature which a collector can reach to the maximum usable water temperature.

An ever-present auxiliary supply for cooling solar collectors is the public water supply. Cool water is always available under pressure. Furthermore, in an open water-heating system, auxiliary cooling water can be drained directly into the storage tank after it has served to cool the collector.

The control system which directs the application of cooling water must be highly reliable and fail-safe. A direct bulb type thermo-mechanical control which senses the temperature of the collector and drives a cooling water valve without requiring any auxiliary power source or electrical amplification step has been found to be highly dependable in industrial service.

For reasons of economy, the same temperature sensor can also be used to operate thermostatic switches directing the operation of pumps for circulating heat transfer water in normal heat collection.

Provision must be made to protect the cooling water system from damage by freezing. It is also essential that cooling water be drained from the collector before the onset of freezing conditions.

Actuation of the cooling system is an indication of failure calling for immediate attention, and should therefore cause an unmistakable signal.

When the crisis condition is over, the protective controller should restore normal operation. Failure of the protective control itself, however, should leave cooling water flowing until steps are taken to repair it.

All these functions are provided by the system about to be described.

Accordingly, the primary object of this invention is to provide an economical, fail-safe auxiliary system for cooling a solar collector, to prevent it from reaching temperatures which would damage the materials when normal heat transfer circulation is interrupted.

Other objects are to avoid freezing, to provide a system which is independent of auxiliary electric power, which protects against failure of its control system, which signals when it is cooling, and which automatically restores normal operation when corrective steps have been taken.

Another object is to provide an auxiliary system for cooling a solar collector of the type having circulating fluid, when normal circulation fails, comprising direct mechanical temperature responsive means for admitting domestic water to the collector automatically when a predetermined safe temperature is exceeded.

Figure 1A:
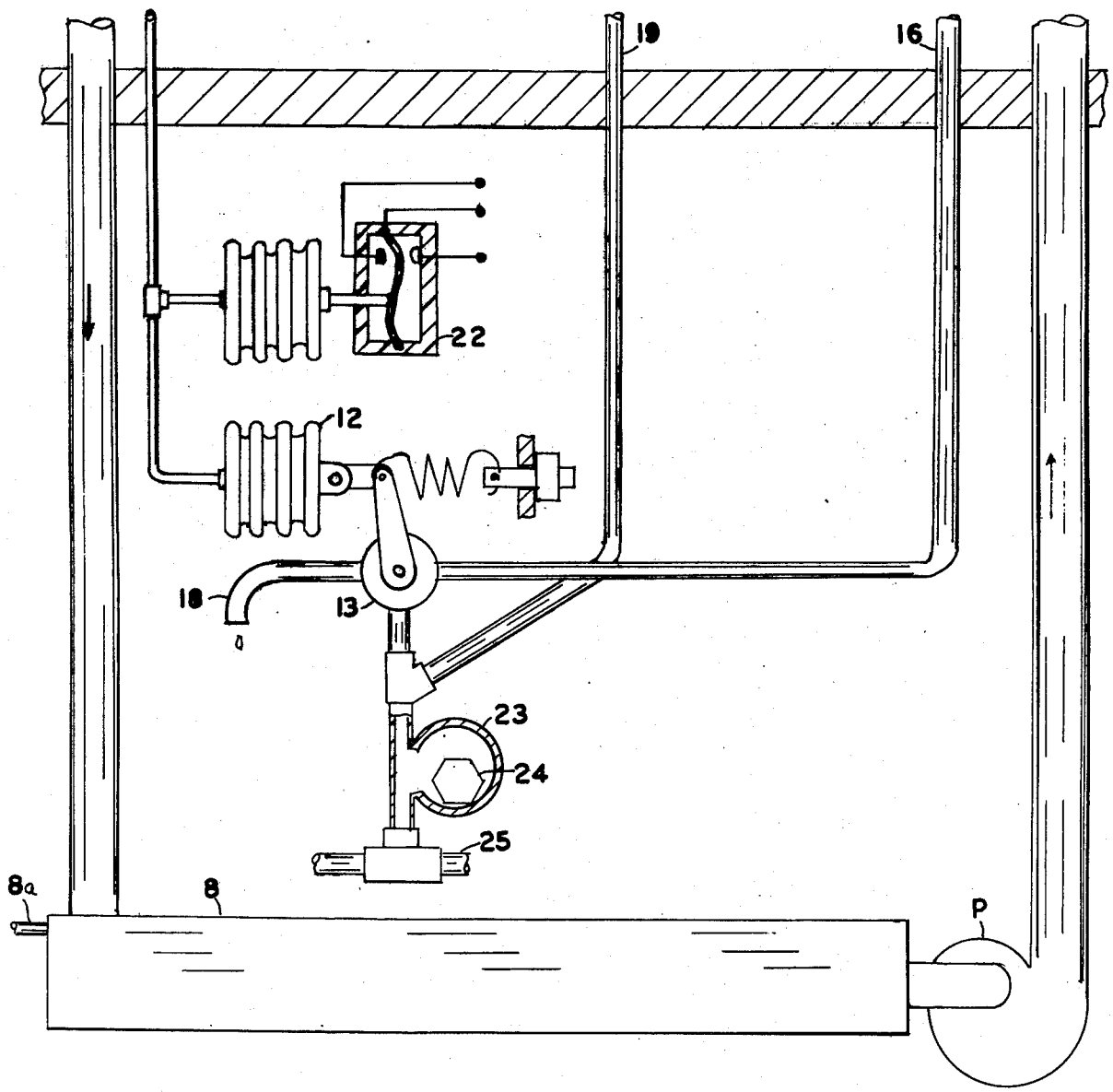

FIGS. 1 & 1A are a side view partly in section of a collector cooling system according to this invention.

The invention may be used with a collector, for instance according to co-pending application number 616,780, filed on Sept. 25, 1975, for SOLAR HEAT COLLECTOR BOOSTER.

In the Figure, a blackened solar absorber plate 1 is supported above a house roofing layer 2, by a layer or mat of wettable fiberglass 3. Heat loss from the top or front of the absorber plate is prevented by two spaced apart translucent covers 4 and 5. A manifold pipe 6 normally distributes water to the top edge of the mat and this water trickles down in the mat between the absorber plate 1 and the roofing 2, picking up heat from the absorber plate, and finally falling into an insulated gutter 7 from which it runs down into a heat storage tank 8. The tank 8 has an overflow 8a defining the maximum water level in the tank. Normally the water in the tank is continuously pumped up to the manifold 6 by pump P whenever enough sunlight is falling on the absorber plate 1 to generate useful heat.

Near the bottom of the absorber plate is a temperature sensor bulb 9 partially filled with a vaporizable antifreeze liquid 10, which may be ethyl alcohol or a mixture of water and methyl alcohol. Other liquids which:

1. Have a vapor pressure less than one atmosphere at the highest useful collector temperature,
2. Either do not freeze or do not expand to damage the sensor system upon freezing at the lowest expected temperature, and
3. Do not corrode the metal bulb, tubing and bellows, may also be used.

This bulb communicates via tube 11 with a bellows 12, located within the insulated thermal envelope of the house. The bulb 9, tube 11, and bellows 12, are evacuated to contain nothing but the liquid 10 and its vapor. Consequently, the force of the bellows 12 proportional to the vapor pressure of fluid 10, is responsive to the temperature of the absorber plate 1 as detected by the sensor bulb 9.

A three-way valve 13 is opened by the adjustable tension spring when the pressure of the fluid 10 is great enough to let the bellows 12 be extended. This condition is normally not reached, because the circulating water in the mat 3 carries away heat, keeping the temperature of the bulb 9 low, and the vapor pressure of fluid 10 correspondingly low. However, if the water circulation stops, the temperature may approach unsafe levels, and the valve 13, will open. Domestic water from pipe 25 then flows through pipe 16 to the secondary manifold 17 and is distributed from there into the top edge of the fiberglass mat 3, where it carries away heat just as the circulating water from manifold 6 would normally. Although the secondary manifold 17 could be omitted and pipe 16 connected to manifold 6, the system would then fail if the holes of manifold 6 were to become plugged.

When the temperaure at bulb 9 drops, the three-way valve 13 shuts off the flow of domestic water. The water in the pipe 16 can then drain out through the tube 18, thereby preventing damage by freezing.

By a suitable choice of liquid 10, the vapor pressure within the temperature sensing system is normally always below atmospheric pressure. Thus, if a leak in the sensing system should develop, the valve 13 would open, causing fail safe operation.

Although valve 13 is shown as a simple direct-acting three-way rotary valve, it may also be a self-piloted diaphragm valve similar in action to solenoid-actuated valves now widely used in washing machines and the like to valve a large flow of water while requiring only a small amount of mechanical work. A two-way valve can also be used, if pipe 16 is provided with a slow leak near the valve to drain the pipe when the valve is closed.

As an ultimate safety, a generally vertical pipe 19 may be provided, sealed by a close-fitting plug 20, which is retained by a fusible wire 21. Air bubbles, normally present in domestic water, collect in the vertical pipe by gravity, so that normally it contains no water subject to freezing. However, if for any reason the temperature at the fusible wire should exceed its melting point, the trapped air will be expelled and will be followed by a flow of cooling domestic water. A pipe connection 26, shown dotted for clarity, delivers the cooling water flow to the auxiliary manifold 17, from which it flows down to cool the collector. This flow of water will continue until the domestic water supply is shut off and the fusible wire 21 is replaced.

Opening of the plug 20 is "catastropic" in the sense that if the fuse wire fails, the plug will open fully and irreversibly. This unit is made accessible so that the plug 20 can be reinserted and the fuse wire replaced when the domestic water flow has been shut off to repair the failure condition.

Flow of water through valve 13 or through the pipe 19 drives an hydraulic noisemaker which may be constructed of a vortex chamber 23 and a polygonal weight 24. When water is flowing, the weight rolls around the vortex chamber producing a distinctive noise transmitted throughout the domestic water piping system.

There are other fluidic and mechanical devices known which can be used to produce an acoustic noise vibration in response to water flow.

To make full use of the temperature sensing system, the tube 11, may also branch to one or more adjustable vacuum switches 22. Such a switch may be connected for example, to turn on a pump when the sensor bulb 9 rises to the minimum usable water temperature.

There are other well known direct mechanical means for operating a remote water valve in a protected non-freezing environment in response to the temperature of a sensor in thermal contact with the collector plate which may be exposed to freezing. Sensors for such means may depend on all-liquid thermometer sensors, on differential expansion bimetal sensors or on change of volume with phase change from solid to liquid of metal alloys, for example. Action at a distance may alternatively utilize a mechanical linkage, push wire, or flexible shaft. The embodiment which has been described, however, is believed to have superior reliability and convenience of installation in the current state of the art.

From the foregoing description it will be evident to those skilled in the art that this collector cooling system provides a practical, fail-safe means for protecting a solar collector from overheating. It will also be evident that application of the system may be extended to a wide variety of other collector types simply by adding suitable auxiliary heat exchange water passages in the collector where necessary.

We claim:

1. An auxiliary system for cooling a solar collector of the type having circulating fluid and mounted in a structure having a domestic water supply, when normal circulation fails, comprising direct mechanical temperature responsive means and means responsive to the temperature responsive means for admitting domestic water to the collector automatically when a predetermined safe temperature is exceeded.

2. An auxiliary cooling system according to claim 1, in which said direct mechanical temperature-responsive means includes a fusible plug valve which opens at a predetermined collector temperature to pass domestic water to said collector.

3. Apparatus as in claim 1 wherein the solar collector has freeze protection means.

4. An auxiliary system for cooling a solar collector of the type having circulating fluid, when normal circulation fails, comprising direct mechanical temperature responsive means for admitting domestic water to the collector automatically when a predetermined safe temperature is exceeded,
    said direct mechanical temperature responsive means including a continuously upward domestic water feed pipe which traps bubbles, thereby excluding domestic water from areas subject to freezing except when said predetermined safe temperature is exceeded.

5. An auxiliary system for cooling a solar collector of the type having circulating fluid, when normal circulation fails, comprising direct mechanical temperature responsive means for admitting domestic water to the collector automatically when a predetermined safe temperature is exceeded,
    said direct mechanical temperature responsive means including a sensor bulb, a bellows operatively connected to said sensor bulb, a vaporizable liquid within said bulb and said bellows, whereby the pressure of said vaporizable liquid is responsive to temperature in said collector and a valve mechanically connected to be actuated by said bellows for controlling the flow of domestic water to said collector.

6. An auxiliary cooling system according to claim 5, in which said valve is biased to pass domestic water when the pressure of said vaporizable liquid is equal to atmospheric pressure.

7. An auxiliary cooling system according to claim 5, including an hydraulic noisemaker connected to the water supply means to produce an audible alarm signal when domestic water is flowing to said collector.

* * * * *